United States Patent
Sivasankaran

(10) Patent No.: US 10,244,076 B2
(45) Date of Patent: Mar. 26, 2019

(54) SECURE CLOUD INTERCONNECT PRIVATE ROUTING

(71) Applicant: Verizon Patent and Licensing Inc., Arlington, VA (US)

(72) Inventor: Vela Sivasankaran, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 421 days.

(21) Appl. No.: 14/584,624

(22) Filed: Dec. 29, 2014

(65) Prior Publication Data

US 2016/0191341 A1    Jun. 30, 2016

(51) Int. Cl.
| | | |
|---|---|---|
| *G06F 15/177* | (2006.01) | |
| *H04L 29/08* | (2006.01) | |
| *H04L 12/24* | (2006.01) | |
| *H04L 12/46* | (2006.01) | |
| *H04L 12/723* | (2013.01) | |
| *H04L 12/741* | (2013.01) | |

(52) U.S. Cl.
CPC .......... *H04L 67/32* (2013.01); *H04L 12/4641* (2013.01); *H04L 41/5051* (2013.01); *H04L 41/5077* (2013.01); *H04L 41/5096* (2013.01); *H04L 45/50* (2013.01); *H04L 45/745* (2013.01)

(58) Field of Classification Search
CPC . H04L 63/0272; H04L 12/4641; H04L 45/50; H04L 45/745; H04L 63/20; H04L 41/0806; H04L 45/00; H04L 45/22; H04L 45/586; H04L 47/20
See application file for complete search history.

(56) References Cited

U.S. PATENT DOCUMENTS

| | | | | |
|---|---|---|---|---|
| 8,184,570 | B2* | 5/2012 | Chun | H04L 1/1893 370/225 |
| 9,350,710 | B2* | 5/2016 | Herle | H04L 63/0272 |
| 9,413,766 | B2* | 8/2016 | Larson | H04L 63/0876 |
| 2007/0104119 | A1* | 5/2007 | Sarkar | H04L 12/4641 370/254 |
| 2014/0101317 | A1* | 4/2014 | Yoon | H04L 41/145 709/226 |
| 2014/0337500 | A1* | 11/2014 | Lee | H04L 41/12 709/223 |
| 2015/0113123 | A1* | 4/2015 | Yeung | H04L 41/12 709/224 |

(Continued)

*Primary Examiner* — Suraj M Joshi
*Assistant Examiner* — Ayele F Woldemariam

(57) ABSTRACT

A network device is located in a cloud routing services center that is separate from a customer network. The network device provides a user interface to solicit, from a customer device outside the cloud routing services center, structured routing criteria for virtual private network (VPN) routes over a Multiprotocol Label Switching (MPLS) network and receives, from the customer device, customer routing criteria selected from the structured routing criteria. The network device retrieves network configuration data for the MPLS network and applies the customer routing criteria to the network configuration data to generate a customer VPN routing plan for the MPLS network. The network device analyzes the customer VPN routing plan to determine if the routing plan is viable and, if the routing plan is viable, configures devices in the MPLS network to implement a customer VPN based on the customer VPN routing plan.

20 Claims, 8 Drawing Sheets

(56) References Cited

U.S. PATENT DOCUMENTS

2015/0188810 A1* 7/2015 Salkintzis ............ H04W 80/04
370/328
2015/0244617 A1* 8/2015 Nakil .................. G06F 9/45558
709/224

* cited by examiner

SECURE CLOUD INTERCONNECT PRIVATE ROUTING

BACKGROUND

A provider of communication services may offer cloud computing services via a cloud computing center. Cloud computing may refer to the delivery of computing as a service, rather than as a product, through the use of resources available over the provider's network. The purchased services may be hosted at a cloud services center, which may not be part of the provider's network.

DETAILED DESCRIPTION OF PREFERRED EMBODIMENTS

Figure 1:
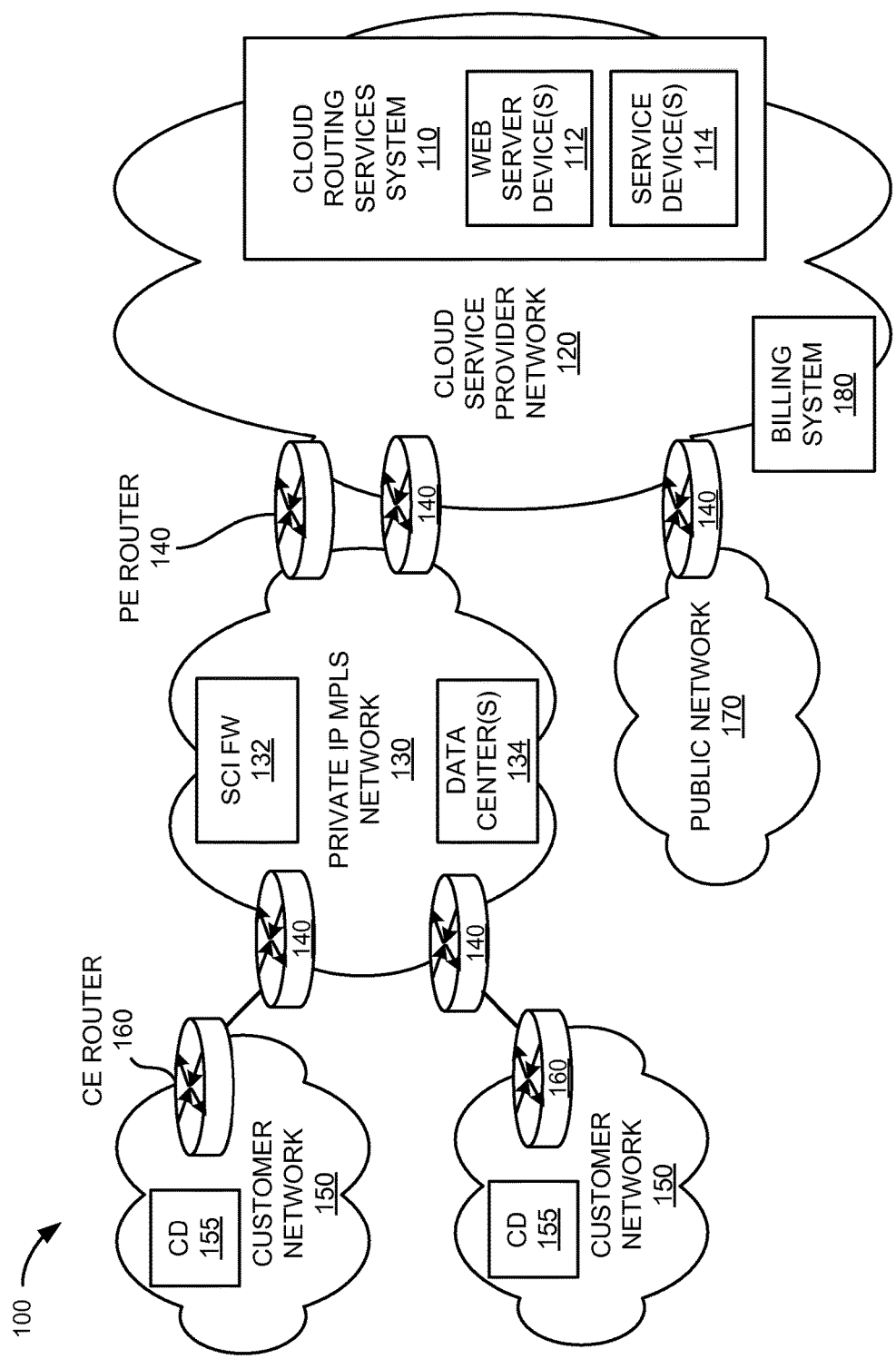
FIG. 1 is a diagram illustrating an exemplary environment according to an implementation described herein.

The following detailed description refers to the accompanying drawings. The same reference numbers in different drawings may identify the same or similar elements.

Systems and methods described herein provide automated route-reconfiguration services for customer virtual private networks (VPNs) and/or private IP networks. A Multiprotocol Label Switching (MPLS) VPN uses a set of sites that are interconnected by means of an MPLS provider core network. At each customer site, one or more customer edge (CE) routers attach to one or more provider edge (PE) routers.

Optimizing network route configuration requires customers to take into account numerous factors. For example, different cloud service providers may offer different capabilities and traffic capacities. Data traffic must meet certain regulatory/compliance requirements, which may differ for different types of data. Data residency requirements may differ in local jurisdictions around the world. Multiple route options may provide different levels of efficiency/optimization, while accounting for no-pass-through zones and/or limited-traffic zones. Customers may need to add or reduce capacity for a particular route, add or delete a route, or optimize routes in a mesh topology. Implementing route reconfiguration, filtering changes (e.g., prefix deletion/addition in routing tables), and other policy enforcement via manual data entry can result in routing mistakes. Mistakes in manual entries can also lead to billing errors and/or customer inquiries, and can require additional manual intervention to resolve issues. Individual enterprise customers may spend significant time and resources to manage routing operations The systems and methods described herein may provide a user interface to solicit structured customer criteria for routes and apply other network constraints/policies and automatically determine a route reconfiguration solution over network Layer 3. Layer 3 may refer to the network layer in the Open Systems Interconnection (OSI) model. The systems and methods may automatically configure devices in an MPLS network to add prefixes to routing tables, delete prefixes from routing tables, and/or reconfigure routes for particular customers based on, for example, capacity management policies, route management policies, pass-through restrictions/no-residency zones, data center capabilities, and/or regulatory/compliance requirements.

According to implementations described herein, a network device may be located in a cloud routing services center that is separate from a customer network. The network device may provide a user interface to solicit, from a customer device outside the cloud routing services center, structured routing criteria for virtual private network (VPN) routes over a Multiprotocol Label Switching (MPLS) network and may receive, from the customer device, customer routing criteria selected from the structured routing criteria. The network device may retrieve network configuration data for the MPLS network and may apply the customer routing criteria to the network configuration data to generate a customer VPN routing plan for the MPLS network. The network device may analyze the customer VPN routing plan to determine if the routing plan is viable and, if the routing plan is viable, may configures devices in the MPLS network to implement a customer VPN based on the customer VPN routing plan.

FIG. 1 is an exemplary network environment 100 in which systems and/or methods described herein may be implemented. As shown in FIG. 1, environment 100 may include a cloud routing services system 110, a cloud service provider network 120, a private IP multiprotocol label switching (MPLS) network 130, provider edge (PE) routers 140, one or more customer networks 150, one or more customer edge (CE) routers 160, a public network 170, and a billing system 180. While FIG. 1 shows a specific arrangement of networks and devices for illustrative purposes, in practice, environment 100 may include multiple other cloud routing services systems 110, cloud service provider networks 120, private IP MPLS networks 130, provider edge routers 140, customer networks 150, customer edge routers 160, public networks 170, billing systems 180.

Generally, cloud routing services system 110 may solicit routing criteria from customers and automatically apply routing policies to achieve the customer criteria. Cloud routing services system 110 may make it easier for customers (e.g., operating customer networks 150) to optimize packet routing for VPN and PIP networks. More particularly, cloud routing services system 110 may employ software defined networking (SDN)-based solutions over network Layer 3.

Cloud routing services system 110 may include one or more web server devices 112 and one or more service devices (SD) 114. Web server device 112 may facilitate submission and/or retrieval of customer routing criteria from a customer device (e.g., a customer device (CD) 155 in customer network 150). Web server device 112 may dynamically generate web pages for each user device 155 accessing web server device 112. In one implementation, web server device 112 may provide an interface to a services portal that allows for access to multiple cloud-based services (e.g., facilitated by multiple server devices including service devices 114). For example, web server device 112 may provide an account login scheme for a user to access multiple services, including calendar services provided by service devices 114. As described further herein, web server device 112 may provide a structured interface to solicit routing policies from customers. The routing policies can be used to automatically configure an optimal VPN routing path through MPLS network 130.

Service device 114 may include one or more server devices and/or storage devices, for providing cloud services for customers. Service device 114 may connect to cloud service provider network 120 at Layer 2 or Layer 3. Service device 114 may receive customer policies from web server device 112. Service device 114 may also obtain current configuration and policy information for MPLS network 130. According to implementations described herein, service device 114 may configure network devices to optimize routes, for each customer VPN, through which IP packets traverse MPLS network 130. For example, service device 114 may perform automatic prefix-addition, prefix-deletion, and/or route reconfiguration based on various policies. The various policies may include capacity management policies, route management policies, no pass-through/no residency zones, partner site capabilities, and/or regulatory/compliance requirements. Policies may be supplied by a customer (e.g., for customer criteria) and/or network administrators (e.g., for MPLS network 130 criteria).

Cloud service provider network 120 may include one or more devices that connect cloud routing services system 110 to MPLS network 130, and that enable a customer to access cloud routing services system 110 via MPLS network 130. Cloud service provider network 120 may include a public IP packet-switched network, a circuit-switched network, or a combination thereof. For example, cloud service provider network 120 may include a local area network (LAN), a wide area network (WAN), a metropolitan area network (MAN), an ad hoc network, an intranet, a fiber optic-based network (e.g., a fiber optic service network), a wireless network (e.g., a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof), and/or a combination of these or other types of networks. In one implementation, cloud service provider network 120 may correspond to a Border Gateway Protocol (BGP) autonomous system. In another implementation, cloud service provider network 120 may include more than one BGP autonomous system.

Private IP MPLS network 130 may include a multi-protocol label switched network, a private IP packet-switched network, a private circuit-switched network, or a combination thereof. Private IP MPLS network 130 may include devices and/or systems for providing services, such as services from cloud service provider network 120. In some implementations, private IP MPLS network 130 may provide redundancy and/or the ability to distribute network loads. For example, private IP MPLS network 130 may include an IP network or a MPLS network implementing an Interior Gateway Protocol (IGP), BGP, or another protocol that implements a minimum cost end-to-end path for routing between nodes. Private IP MPLS network 130 may provide one or more interface options to customer devices 155 and/or CE routers 160 (e.g., residing on a customer network 150).

Private IP MPLS network 130 may include secure cloud interconnect (SCI) firewall (FW) 132 and data centers 134. Firewall 132 may include one or more devices that may protect cloud routing services system 110 and/or cloud service provider network 120 from unauthorized access. For example, firewall 132 may include filters that may drop data units (e.g., packets) that are not associated with an authorized source, are not associated with an authorized protocol, and/or may perform another action on a data unit based on a filter. Firewall 132 may differ from a firewall in cloud routing services system 110 or cloud service provider network 120, which may provide firewall as a service to customers associated with cloud service provider network 120.

Data centers 134 may include one or more networked storage devices, or other types of computation or communication devices, to aggregate large quantities of data (e.g., content and content metadata), process the data, and/or distribute the data. Data centers 134 may be implemented, for example, on a regional scale, where there may be data centers 134 located at particular major metropolitan regions of a country. In one implementation, data centers 134 may provide a cloud-based computing service to provide shared resources, software, and/or information.

Provider edge router 140 may include a provider edge device that connects cloud service provider network 120 to private IP MPLS network 130 or that connects customer network 150 to private IP MPLS network 130. According to one implementation, provider edge router 140 may employ one or more protocols for receiving routing configuration information from cloud routing services system 110 and exchanging the routing configuration information with other devices in network 130 (e.g., other routers).

Customer network 150 may include a network associated with a customer. Customer network 150 may include one or more customer devices 155. Customer device 155 may include any device with a communication function, such as, for example, a personal computer or workstation; a server device; a portable computer; a printer, fax machine, or another type of peripheral device; a television, a projector, a speaker, or another type of a display or audio output device; a set-top box; a gaming system; a camera, a video camera, a microphone, a sensor, or another type of input or content recording device; a portable communication device (e.g. a mobile phone, a smart phone, a tablet computer, a global positioning system (GPS) device, and/or another type of wireless device); a voice over Internet Protocol (VoIP) telephone device; a radiotelephone; a gateway, a router, a switch, a firewall, a network interface card (NIC), a hub, a bridge, a proxy server, or another type of firewall device; a line terminating device, such as an add-drop multiplexer or an optical network terminal; a cable modem; a cable modem termination system; and/or any type of device with communication capability.

Customer device 155 may connect to a CE router 160 in customer network 150 using any Layer 2 or Layer 3 technology employed by the customer in customer network 150, and CE router 160 may connect to a PE router 140. The provider may provide a connection from PE router 140 to cloud service provider network 120 and/or another PE router 140. The connection may be implemented using an access technique selected by the customer, such as an MPLS tunnel, a GRE tunnel, and/or an IPSec tunnel.

Public network 170 may include a combination of networks that support IP communications. Public network 170 may include, for example, an untrusted network, such as the Internet. Public network 170 may further include transport and/or network devices such as routers, switches, and/or firewalls.

Billing system 180 may include one or more network devices that manage customer billing for services provided via cloud service provider network 120 and/or MPLS network 130. For example, billing system 180 may generate bills to be provided to customers based on regular subscription rates, actual usage levels, and/or private routing management services as described herein.

Although FIG. 1 shows exemplary components of environment 100, in other implementations, environment 100 may include fewer components, different components, differently-arranged components, or additional components than depicted in FIG. 1. Additionally or alternatively, one or more components of environment 100 may perform functions described as being performed by one or more other components of environment 100.

Figure 2:
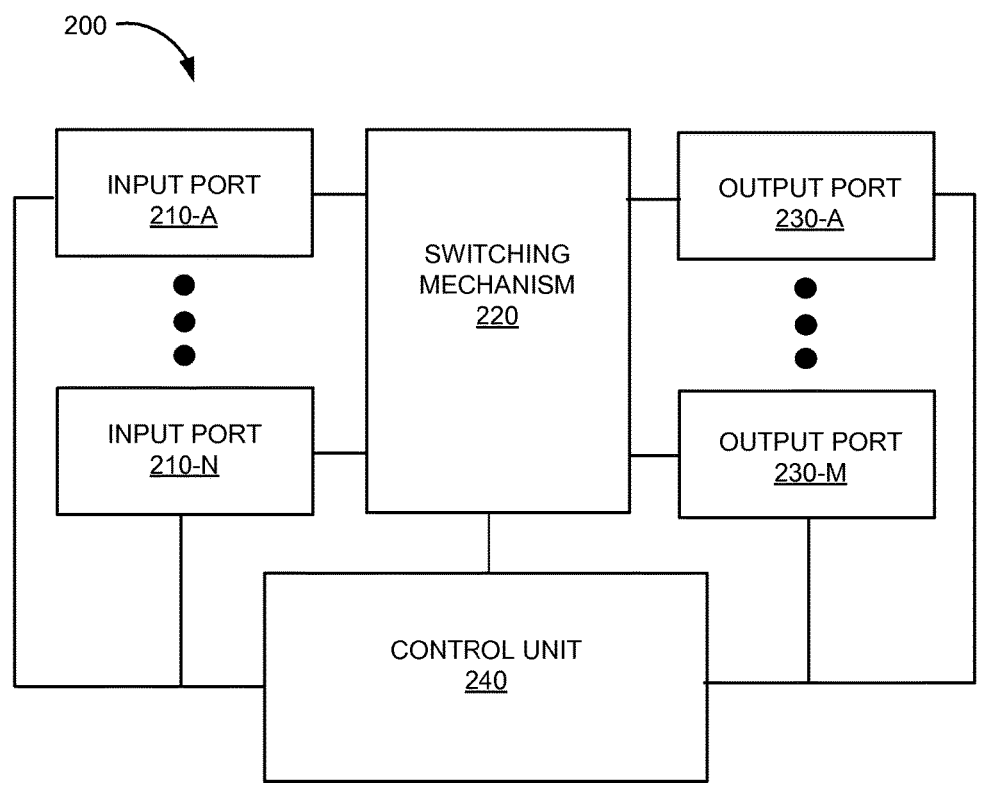
FIG. 2 is a diagram illustrating exemplary components of a provider edge router or customer edge router of FIG. 1.

FIG. 2 is a diagram illustrating example components of routing device 200. Cloud routing services system 110, provider edge router 140, and customer edge router 160 may each include one or more routing devices 200. As shown in FIG. 2, routing device 200 may include one or more input ports 210-A to 210-N (referred to herein individually as "input port 210" and collectively as "input ports 210"), a switching mechanism 220, one or more output ports 230-A to 230-M (referred to herein individually as "output port 230" and collectively as "output ports 230"), and/or a control unit 240.

Input ports 210 may be the points of attachments for physical links and may be the points of entry for incoming traffic. An input port 210 may be associated with an interface card. Input port 210 may perform some or all of data plane processing associated with an incoming packet. Data plane processing may encompass looking up a destination address for an incoming packet, removing (or changing) a label associated with the packet, determining a path through switching mechanism 220, and/or filter the packet based on one or more filters.

Switching mechanism 220 may include one or more switches and/or switch fabrics to facilitate communication between input ports 210 and output ports 230. In one implementation, each of the switch fabrics may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card. Output port 230 may perform some or all of data plane processing associated with an outgoing packet. For example, output port 230 may classify the packet based on a quality of service class, schedule the packet in a particular queue, add (or change) a label associated with the packet, and/or filter the packet based on one or more firewall filters.

Control unit 240 may interconnect with input ports 210, switching mechanism 220, and/or output ports 230 and may control operation of routing device 200. For example, control unit 240 may perform control plane operations associated with routing device 200 (e.g., control unit 240 may use routing protocols and may create one or more routing tables and/or one or more forwarding tables that are used in traffic forwarding).

Although FIG. 2 shows example components of routing device 200, in other implementations, routing device 200 may include fewer components, different components, differently arranged components, and/or additional components than depicted in FIG. 2. Additionally or alternatively, one or more components of routing device 200 may perform one or more tasks described as being performed by one or more other components of routing device 200.

Figure 3:
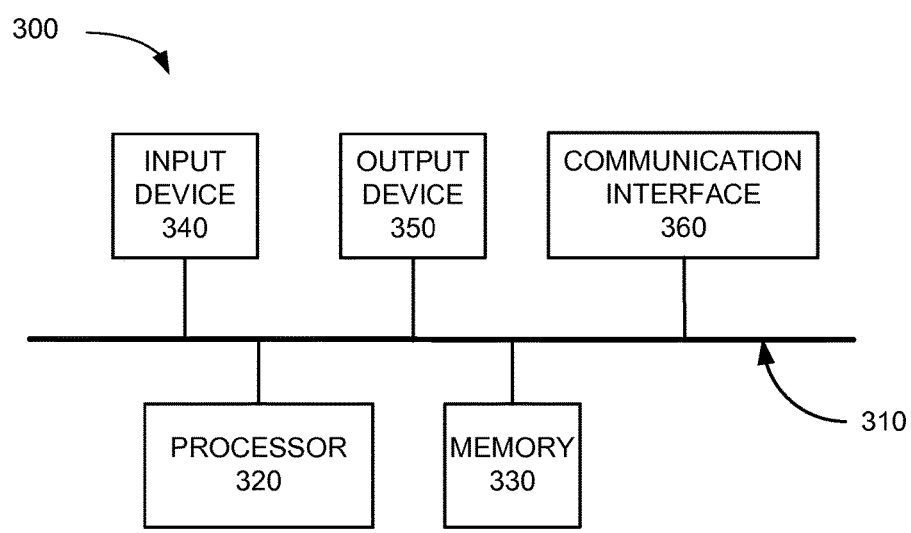
FIG. 3 is a diagram illustrating exemplary components of a device that may be included in one or more components of FIG. 1.

FIG. 3 is a diagram illustrating exemplary components of a device 300 according to an implementation described herein. Cloud routing services system 110 (e.g., control unit 240 of device 200), web server device 112, service device 114, firewall 132, and customer device 155 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying information. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to enabling a customer to provide structured routing criteria, to cloud routing services system 110, for VPN routes over MPLS network 130. Device 300 may also perform certain operations relating to applying the customer routing criteria to current network configuration data and network policies to configure a customer VPN routing plan through MPLS network 130.

Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently-arranged components than depicted in FIG. 3. Additionally or alternatively, one or more components of device 300 may perform one or more tasks described as being performed by one or more other components of device 300.

Figure 4:
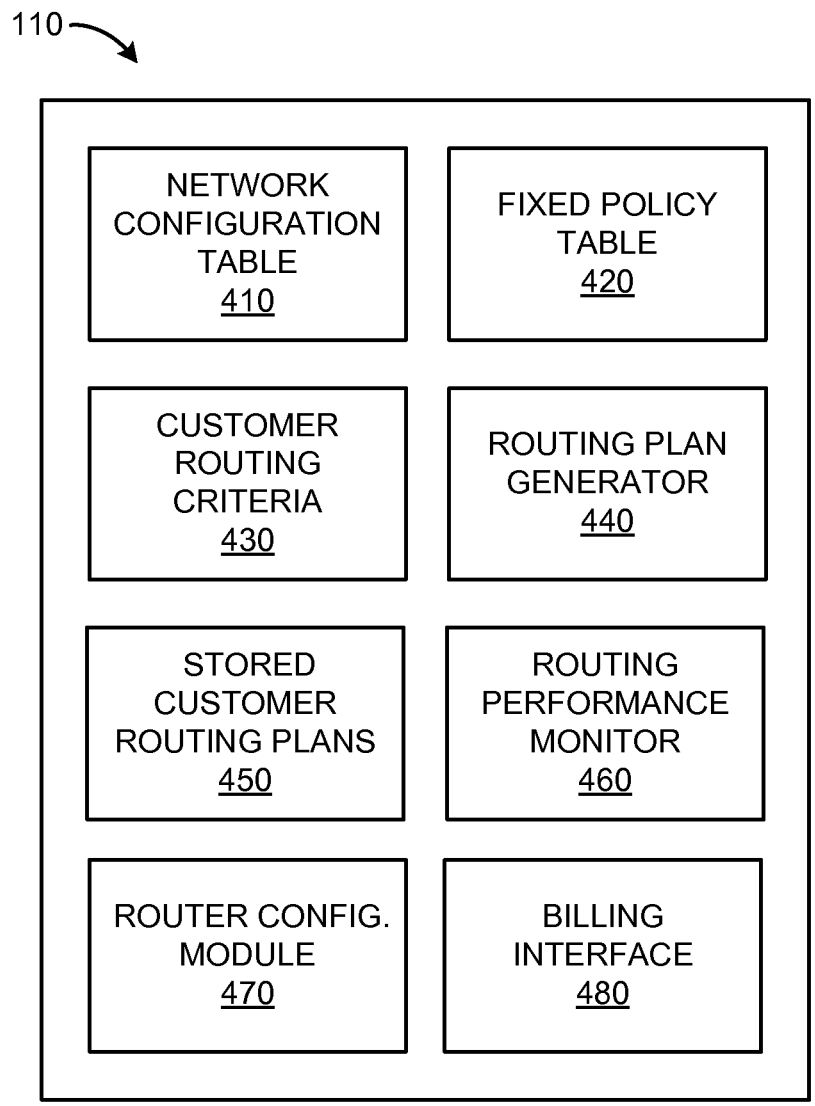
FIG. 4 is a block diagram of exemplary functional components of the cloud routing services system of FIG. 1.

FIG. 4 is a diagram of exemplary functional components of cloud routing services system 110. The functional components of cloud routing services system 110 may be implemented, for example, via processor 320 executing instructions from memory 330. As shown in FIG. 4, cloud routing services system 110 may include a network configuration table 410, a fixed policy table 420, customer routing criteria 430, a routing plan generator 440, stored customer routing plans 450, a routing performance monitor 460, a router configuration module 470, and a billing interface 480.

Network configuration table 410 may include a listing of network devices in MPLS network 130. Network configuration table 410 may include hardware and software components used in the network. Network configuration table 410 may include, for example, a name of each network device, the layer 2 addresses and implemented feature sets, and the layer 3 addresses and implemented features. Cloud routing services system 110 may employ network/device discovery techniques to determine an inventory of devices associated with MPLS network 130, and various protocols may be used to facilitate the network discovery process.

Fixed policy table 420 may include network policies associated with network devices, data center 134 locations, and/or regulations. Network policies may include capacity management policies (e.g., for particular data centers 134 and/or network devices), route management policies (e.g., load balancing, etc.), no-pass-through/no-residency-zones (e.g., for certain types of data), and/or other regulatory and compliance requirements. For example, in one implementation, fixed policy table 420 may indicate a maximum bandwidth, data rate, number of connections, or another capacity for a particular data center 134. In another implementation, fixed policy table 420 may include regional location restrictions for types of data. In another implementation, fixed policy table 420 may indicate certifications for particular data centers 134 and/or network devices (e.g., HIPAA certifications, security certifications, etc.). Fixed policy table 420 may be populated via manual entry (e.g., by a network administrator) and/or via automated network discovery procedures.

Customer routing criteria 530 may include information received from inputs for particular customer routing policies. For example, customer routing criteria 430 may include a table or data structure compiled from customer input solicited through web server device 112. Customer routing criteria 430 may include parameters selected from options in fixed policy table 420, performance requirements (e.g., guaranteed bit rates, quality of service (QoS) levels, etc.), data usage requirements (data volume per month), relevant locations (e.g., geographic locations, customer edge routers, etc.), etc. In one implementation, data usage volume (e.g., GB/month) and/or data rates (guaranteed MB/second) may be associated with a pricing tier that defines a particular subscription plan for an enterprise customer.

Routing plan generator 440 may include logic to automatically generate a routing plan for a customer based on information in network configuration table 410, fixed policy table 420, and customer routing criteria 430. For example, routing plan generator 440 may automatically identify prefix-addition, prefix-deletion, and/or route reconfiguration to optimize connections between customer edge routers 160 through MPLS network 130. In one implementation, routing plan generator 440 may generate a virtual routing table for a particular customer's VPN. The virtual routing table may include all routes pertaining to a specific VPN. The virtual routing table may define routing protocol contexts that are part of the particular customer's VPN, as well as the interfaces on the local PE router 140 that are part of the specific VPN and, hence, would use the virtual routing table. The number of interfaces that can be bound to a virtual routing table is limited by the number of interfaces on the particular PE router 140, and a single interface (e.g., a logical or physical interface) can be associated with exactly one virtual routing table.

Stored customer routing plans 450 may store (e.g., in memory 330) individual routing plans for each customer's VPN(s). For example, cloud routing services system 110 may store instances of each virtual routing table generated for a particular customer. In one implementation, stored customer routing plans 450 may include multiple versions/revisions of a virtual routing table (e.g., for tracking changes, historical records, trouble-shooting, etc.).

Routing performance monitor 460 may collect performance statistics from devices in MPLS network 130 (e.g., from PE routers 140, data center 134, etc.). For example, routing performance monitor 460 may collect data usage rates for a particular customer VPN. In another implementation, routing performance monitor 460 may receive traffic measurements and network element status from another network analytics system that communicates with devices in MPLS network 130 and/or other network devices. Routing performance monitor 460 may compare usage statistics to specifications of offered plan tiers. For example, routing performance monitor 460 may identify if actual data usage rates are significantly under a customer's plan limits. In another implementation, routing performance monitor 460 may monitor for optimized performance. For example, routing performance monitor 460 may identify bottlenecks in a particular routing plan and suggest routing alternatives.

Router configuration module 470 may receive routing plans, such as a virtual routing table, from routing plan generator 440 and provide the routing plans to a customer for execution. In one implementation, routing plans may be communicated to relevant PE routers 140 and/or relevant CE routers 160. In another implementation, routing plan information may be provided to a customer device (e.g., customer device 155) that can provision the customer's CE router 160 and then exchange customer routing information between a CE router 160 and a PE router 140 using existing routing protocols. Routing protocols to exchange customer routing information may include, for example, versions of Enhanced Interior Gateway Routing Protocol (EIGRP), Open Shortest Path First (OSPF), Routing Information Protocol (RIP), and/or Border Gateway Protocol (BGP).

Billing interface 480 may interact with billing system 180. Billing interface 480 may collect information from routing performance monitor 460 and provide data relevant to usage-rate-based billing, use of managed services, etc. In one implementation, billing interface 480 may provide data in response to requests from billing system 180. In another implementation, billing interface 480 may provide periodic data uploads to billing system 180.

Although FIG. 4 shows exemplary functional components of cloud routing services system 110, in other implementations, cloud routing services system 110 may include fewer components, different components, or additional components than depicted in FIG. 4. Alternatively, or additionally, one or more functional components of cloud routing services system 110 may be performed by or in conjunction with another device of cloud service provider network 120.

Figure 5:
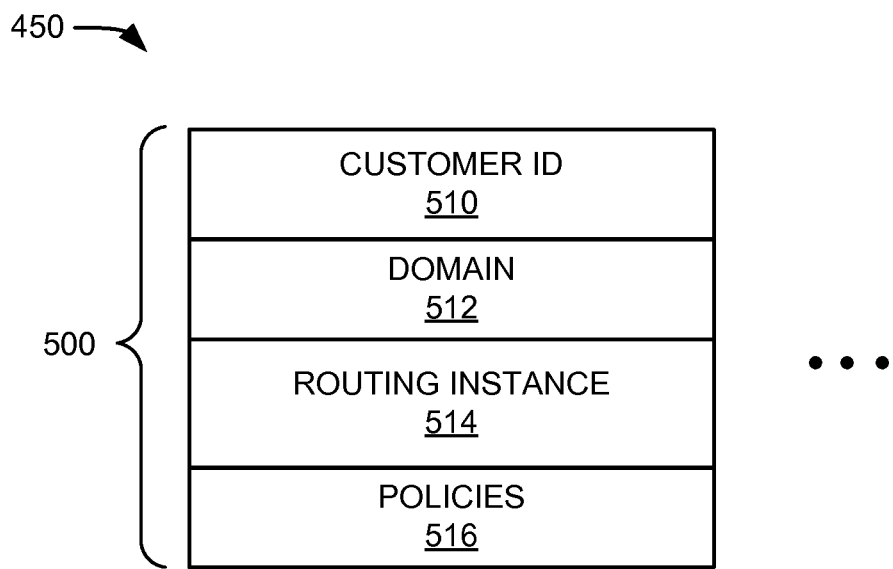
FIG. 5 is a diagram of exemplary data that may be stored in the store customer routing plans of FIG. 4.

FIG. 5 is a diagram illustrating exemplary components that may be included in stored customer routing plans 450. As shown in FIG. 5, stored customer routing plans 450 may include one or more customer records 500 (referred to herein collectively as "customer records 500" and individually as "customer record 500"). Customer record 500 may include a customer identifier (ID) field 510, a domain field 512, a routing instance field 514, and a customer policies field 516.

Customer ID field 510 may include an identifier that uniquely identifies a particular customer. Domain field 512 may include information identifying an L2 domain associated with the customer. Routing instance field 514 may identify a routing instance associated with the customer. For example, routing instance field 514 may include a routing table and one or more forwarding tables associated with a particular customer.

Policies field 516 may store one or more policies associated with the particular routing instance that may be used for policy-based routing or forwarding. For example, policies field 516 may identify a particular guaranteed Quality of Service (QoS) associated with the particular routing instance and/or may enforce a data rate limit associated with the particular routing instance. As another example, policies field 516 may identify a particular service level associated with the access interface (e.g., 'gold' level, 'silver' level, 'bronze' level) that is associated with a particular QoS and/or data rate limits. A service level may define a particular group of service parameters for the customer's routing as defined by a service level agreement.

As yet another example, policies field 516 may include a match condition and an action associated with the match condition. For example, the match condition may correspond to any IP address associated with customer network 150 and the action may correspond to an instruction to forward a data unit (e.g., packet) to a particular interface associated with the customer. Thus, any data unit received from customer network 150 may be forwarded to the particular interface associated with the customer.

Figure 6:
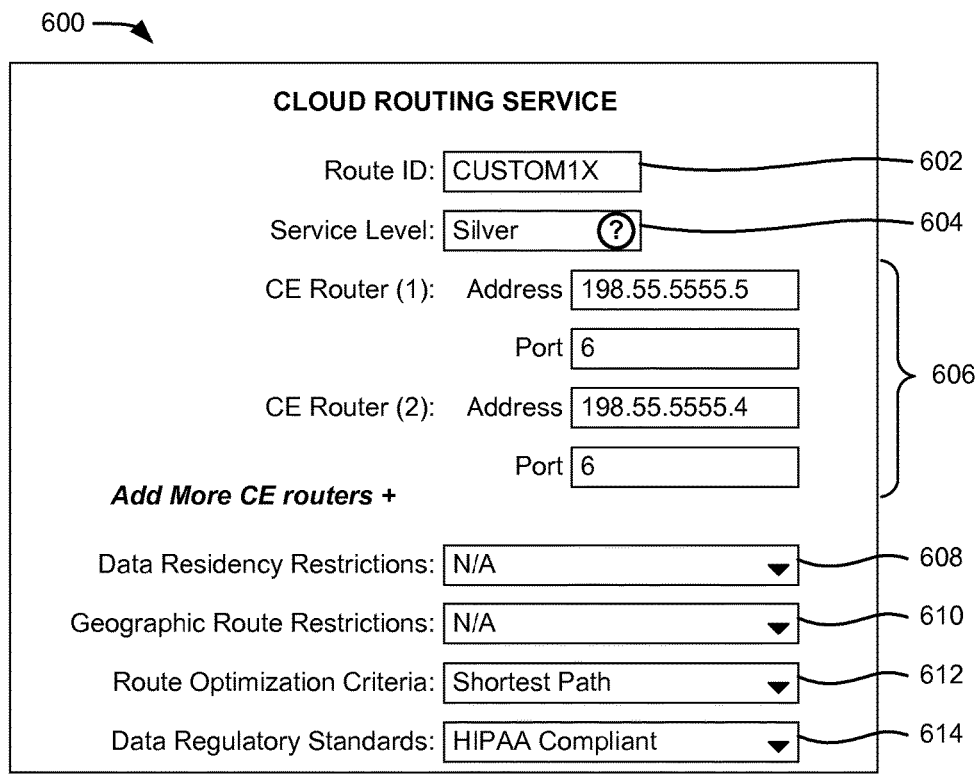
FIG. 6 is a schematic of an exemplary user interface to solicit customer routing criteria.

FIG. 6 depicts a diagram of an exemplary user interface 600 that is capable of being generated by cloud routing services system 110 (e.g., web server device 112). User interface 600 may include a graphical user interface (GUI) or a non-graphical user interface, such as a text-based interface. As illustrated in FIG. 6, user interface 600 may include a customer ID field 602, a service level field 604, a CE router identifiers field 606, a data residency restrictions field 608, a geographic route restrictions 610 field, a route optimization criteria 612 field, and a data regulatory standards field 614.

Route ID field 602 may include a unique character string identifying a particular route or VPN associated with the customer. For new configurations, route ID may be provided as a default value from cloud routing services system 110; while for modified routes, a route ID may be selected, for example, from a group of route IDs associated with the customer. Service level field 604 may include a customer's desired service level for a VPN (e.g., "Bronze," "Silver," "Gold," etc.). The desired service level may represent a QoS level that indicates how particular types of network traffic will be managed/prioritized. CE router identifiers field 606 may include an IP address or another unique identifier for CE router 160. For example, CE router identifiers field 606 may include a pre-populated IP address of the CE router to which customer device 155 is connected. Data residency restrictions field 608 may indicate customer-identified restrictions for data residency within MPLS network 130. For example, data residency restriction field 608 may indicate a maximum/minimum time period that customer data may be stored/cached or a particular geographic location (e.g., particular countries) where data is not allowed to be stored. A geographic route restrictions 610 field may indicate a geographic region that customer data is not allowed to be routed through. Route optimization criteria 612 field may indicate a customer routing optimization preference, such as shortest path, fastest path, etc. Data regulatory standards field 614 may indicate types of traffic traversing the customer VPN for which one or more known regulatory standards should be applied. Regulatory standards may include, for example, HIPAA compliance, Gramm-Leach-Bliley Act (GLBA) compliance, etc.

User interface 600 may include default options for particular fields, such as service level field 604, data residency restrictions field 608, geographic route restrictions 610 field, route optimization criteria 612 field, and data regulatory standards field 614. In some implementations, one or more fields of user interface 600 may include a selection mechanism, such as a radio button, a checkbox, a dropdown menu, etc. to allow a user of user interface 600 to select from one or more of a set of structured options available to the particular customer. Thus, while FIG. 6 provides one example of user interface 600, in other aspects different fields and presentation formats may be included in user interface 600.

Figure 7:
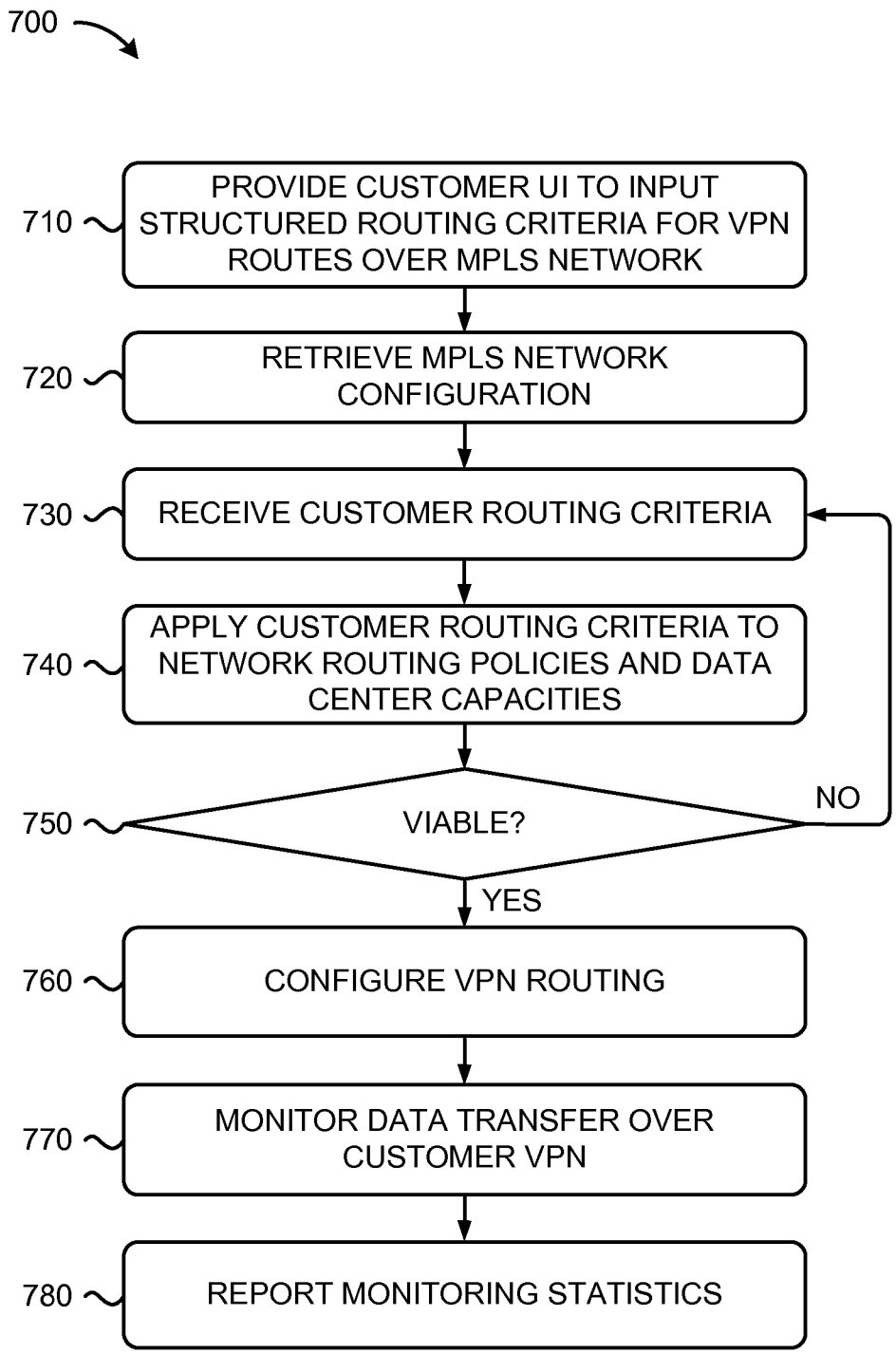
FIGS. 7 and 8 are flow diagrams of an exemplary process for implementing automated route-reconfiguration-services in a cloud environment, according to an implementation described herein.

FIG. 7 is a flow diagram of an exemplary process 700 for implementing automated route-reconfiguration-services in a cloud environment, according to an implementation described herein. In one implementation, process 700 may be performed by cloud routing services system 110 (e.g., via one or more service devices 114).

Process 700 may include providing a user interface to solicit, from a customer, structured routing criteria for VPN routes over an MPLS network, (block 710). For example, web server device 112 may provide a user interface, such as an interactive web page, that may be accessed from customer device 155 (or another user device). The interactive web page may be configured to receive structured user input to identify routing criteria for the customer. As identified in FIG. 6, routing criteria may include, for example, options from user interface 600, such as customer ID 602, a service level 604, CE router identifiers 606, data residency restrictions 608, geographic route restrictions 610, route optimization criteria 612, and/or data regulatory standards 614. The customer may provide input to select and/or enter information in any of fields 602-614.

Process 700 may also include retrieving network configuration data for the MPLS network (block 720). For example, cloud routing services system 110 (e.g., service device 114) may retrieve current network information for MPLS network 130. Current network information may be collected, for example, from network configuration table 410.

Process 700 may additionally include receiving customer routing criteria selected from the structured routing criteria (block 730). For example, web server device 112 may provide the customer input from user interface 700 (received via a browser and sent to web server device 112 over a network(s)) to service device 114 for processing. Web server device 112 may be located in a cloud routing services system 110 or in another network location that allows web server device 112 to communicate customer input to services device 114. The customer input may be stored, for example, in customer routing criteria 430.

Process 700 may further include applying the customer routing criteria to the network configuration data to generate a customer VPN routing plan for the MPLS network (block 740) and analyzing the customer VPN routing plan to determine if the routing plan is viable (block 750). For example, cloud routing services system 110 (e.g., routing plan generator 440) may automatically generate a routing plan for a customer based on information in network configuration table 410, fixed policy table 420, and customer routing criteria 430. Cloud routing services system 110 may determine if a viable routing path exists within MPLS network 130 (e.g., a routing path that satisfies all criteria of network configuration table 410, fixed policy table 420, and customer routing criteria 430). In one implementation, cloud routing services system 110 may employ routing optimization protocols to identify a best-fit routing plan among multiple acceptable options (e.g., routing options that meet criteria in all of network configuration table 410, fixed policy table 420, and customer routing criteria 430).

If the routing plan is not viable (block 750—NO), process 700 may return to block 730 to receive updated customer routing criteria. For example, cloud routing services system 110 may determine that no routing path exists that can simultaneously meet all criteria of network configuration table 410, fixed policy table 420, and customer routing criteria 430. Cloud routing services system 110 may indicate that the customer routing criteria is incompatible with other network limitations and present a user interface (e.g., user interface 600) to solicit revised customer criteria. In one implementation, cloud routing services system 110 may indicate particular criteria that are in conflict and/or suggest alternative customer criteria.

If the routing plan is viable (block 750—YES), process 700 may include configuring devices in the MPLS network to implement a customer VPN based on the customer VPN routing plan (block 760). For example, cloud routing services system 110 (e.g., router configuration module 470) may identify unique route indicators and convert the routing plan to a set of configuration files/forwarding tables that can be implemented by devices (e.g., provider edge routers and/or provider routers) in MPLS network 130. A separate set of configuration files/forwarding tables may be used for each VPN. Using a protocol for exchanging routing information, such as Multiprotocol BGP, cloud routing services system 110 may provide the set of configuration files/forwarding tables to one or more devices (e.g., PE router 140, CE router 160) for distribution throughout MPLS network 130.

Figure 8:
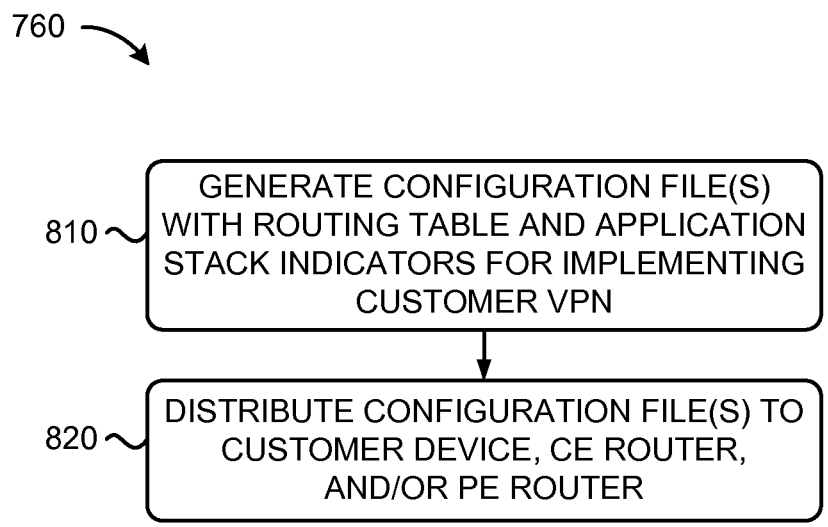

In one implementation, process block 760 may include blocks included in FIG. 8. Referring to FIG. 8, process block 760 may include generating one or more configuration files with a routing table and application stack indicators for implementing the customer VPN (block 810), and distributing the one or more configuration files to a customer device, customer edge router, and/or provider edge router (block 820). For example, cloud routing services system 110 (e.g., router configuration module 470) may generate one or more routing tables and/or configuration files that can be implemented by routers (e.g., PE routers 140 in MPLS network 130) to create the customer VPN. Cloud routing services system 110 may provide the routing tables and/or other configuration files to automatically provision CE routers 160 and PE routers 140 to, for example, apply and process defined prefixes for routing packets via the customer VPN. In another implementation, cloud routing services system 110 may automatically perform software stack deployments for devices in MPLS network 130 to support the customer VPN. For example, cloud routing services system 110 may include, in the configuration file, required software, upgrades, patches, etc. to implement the customer VPN. The configuration file may cause devices (e.g., PE routers 140) in MPLS network 130 to identify software components from the software stack that are not locally installed, fetch any missing software components, and install the missing software components.

Returning to FIG. 7, process 700 may include monitoring data transfers over the customer VPN (block 770) and reporting the monitoring statistics (block 780). For example, cloud routing services system 110 (e.g., routing performance monitor 460) may collect performance statistics from devices in MPLS network 130 that relate to the customer's VPN. In one implementation, cloud routing services system 110 may report performance statistics to billing system 180. In another implementation, cloud routing services system 110 may report performance statistics to marketing personnel or customers.

In the preceding specification, various preferred embodiments have been described with reference to the accompanying drawings. However various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, portions of certain embodiments may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    providing, by a network device, a user interface over a network to a customer device to solicit, from a customer, structured routing criteria for new virtual private network (VPN) routes over a Multiprotocol Label Switching (MPLS) network, wherein the network device is located in a cloud routing services center and the customer device is outside the cloud routing services center;
    receiving, by the network device and from the customer device, customer routing criteria, for the new VPN routes, selected from the structured routing criteria;
    retrieving, by the network device, network configuration data that includes a list of network devices in the MPLS network and network policies associated with the network devices in the MPLS network, wherein the network configuration data further includes routing policies and data center capacities for the MPLS network;
    applying, by the network device, the customer routing criteria to the network configuration data to generate a customer VPN routing plan for the new VPN routes over the MPLS network, wherein the routing plan includes a virtual routing table with all routes pertaining to a customer VPN and interfaces, on a provider edge router, that are part of the customer VPN;
    analyzing, by the network device, the customer VPN routing plan to determine if a routing path exists to satisfy criteria of the routing plan;
    soliciting, by the network device and after determining that the customer VPN routing path does not exist, revised customer routing criteria for the new VPN routes; and
    configuring, by the network device and after determining that the routing path does exist, devices in the MPLS network to implement the customer VPN based on the customer VPN routing plan, wherein the configuring includes generating one or more configuration files for the network devices in the MPLS network.

2. The method of claim 1, wherein the one or more configuration files include a routing table for a provider edge router of the MPLS network.

3. The method of claim 2, wherein the configuring the devices in the MPLS network further includes:
    distributing the routing table to a customer device or a customer edge router.

4. The method of claim 2, wherein the configuring the devices in the MPLS network further includes:
    distributing the routing table to the provider edge router in the MPLS network.

5. The method of claim 1, further comprising:
    monitoring, by the network device, data usage over the customer VPN; and
    reporting, by the network device, the data usage.

6. The method of claim 1, wherein the user interface to solicit structured routing criteria includes user input fields for:
    data residency restrictions,
    geographic route restrictions, or
    data regulatory standards.

7. The method of claim 6, wherein the user interface to solicit structured routing criteria further includes user input fields for:
    a service tier indicating a desired level of service.

8. A device, comprising:
    a network interface to communicate with a remote system;
    a memory for storing instructions to be executed by a processor; and
    the processor configured to execute the instructions to:
        provide a user interface to solicit, from a customer device, structured routing criteria for new virtual private network (VPN) routes over a Multiprotocol Label Switching (MPLS) network, wherein the device is located in a cloud routing services center that is separate from a customer network for the customer device;
        receive, from the customer device, customer routing criteria for a new VPN route, selected from the structured routing criteria;
        retrieve network configuration data that includes a list of network devices in the MPLS network and network policies associated with the network devices in the MPLS network, wherein the network configuration data further includes routing policies and data center capacities for the MPLS network;
        apply the customer routing criteria to the network configuration data to generate a customer VPN routing plan for the new VPN route over the MPLS network, wherein the routing plan includes a virtual routing table with all routes pertaining to a customer VPN and interfaces, on a local provider edge (PE) router, that are part of the customer VPN;
        analyze the customer VPN routing plan to determine if a routing path exists to satisfy criteria of the routing plan;
        solicit, after determining that the customer VPN routing path does not exist, revised customer routing criteria for the new VPN routes; and
        configure, after determining that the routing path does exist, devices in the MPLS network to implement the customer VPN based on the customer VPN routing plan, wherein the configuring includes generating one or more configuration files for the network devices in the MPLS network.

9. The device of claim 8, wherein the one or more configuration files include a routing table for the provider edge router of the MPLS network.

10. The device of claim 9, wherein, when configuring the devices in the MPLS network, the processor is further configured to distribute the routing table to a customer device or a customer edge router.

11. The device of claim 9, wherein, when configuring the devices in the MPLS network, the processor is further configured to distribute the routing table to a provider edge router in the MPLS network.

12. The device of claim 8, wherein the processor is further configured to:
monitor data usage over the customer VPN; and
report the data usage.

13. The device of claim 8, wherein the user interface to solicit structured routing criteria includes user input fields for:
data residency restrictions,
geographic route restrictions, or
data regulatory standards.

14. A non-transitory computer-readable medium, storing instructions executable by one or more processors, the non-transitory computer-readable medium comprising instructions to:
provide a user interface to solicit, from a customer, structured routing criteria for new virtual private network (VPN) routes over a Multiprotocol Label Switching (MPLS) network;
receive, from a customer device outside a cloud routing services center, customer routing criteria for a new VPN route, selected from the structured routing criteria;
retrieve network configuration data that includes a list of network devices in the MPLS network and network policies associated with the network devices in the MPLS network, wherein the network configuration data further includes routing policies and data center capacities for the MPLS network;
apply the customer routing criteria to the network configuration data to generate a customer VPN routing plan for the new VPN route over the MPLS network, wherein the routing plan includes a virtual routing table with all routes pertaining to a customer VPN and interfaces, on a local provider edge (PE) router, that are part of the customer VPN;
analyze the customer VPN routing plan to determine if a routing path exists to satisfy criteria of the routing plan;
solicit, after determining that the customer VPN routing path does not exist, revised customer routing criteria for the new VPN routes; and
configure, after determining that the routing path does exist, devices in the MPLS network to implement the customer VPN based on the customer VPN routing plan, wherein the configuring includes generating one or more configuration files for the network devices in the MPLS network.

15. The non-transitory computer-readable medium of claim 14, further comprising instructions to:
when the routing path does not exist, indicate to the customer particular customer routing criteria that are in conflict.

16. The non-transitory computer-readable medium of claim 14, wherein the user interface to solicit structured routing criteria includes user input fields for:
data residency restrictions,
geographic route restrictions, or
data regulatory standards.

17. The method of claim 1, further comprising:
when the routing path does not exist, indicating particular customer routing criteria that are in conflict.

18. The device of claim 8, wherein the processor is further configured to:
indicate particular customer routing criteria that are in conflict, when the routing path does not exist.

19. The device of claim 8, wherein the user interface to solicit structured routing criteria includes a user input field for:
a service tier indicating a desired level of service.

20. The device of claim 8, wherein the user interface to solicit structured routing criteria includes a user input field for:
data residency restrictions, and
geographic route restrictions.

* * * * *